United States Patent
Chiang et al.

(10) Patent No.: US 11,193,060 B2
(45) Date of Patent: Dec. 7, 2021

(54) METHOD FOR SYNTHESIZING PEROVSKITE QUANTUM DOT FILM

(71) Applicants: National Taiwan University of Science and Technology, Taipei (TW); NATIONAL TAIWAN NORMAL UNIVERSITY, Taipei (TW); National Taiwan University, Taipei (TW)

(72) Inventors: Chih-Hao Chiang, Taipei (TW); Ting-You Li, Taipei (TW); Meng-Lin Tsai, Taipei (TW); Ya-Ju Lee, Taipei (TW); Hsiang-Chieh Lee, Taipei (TW)

(73) Assignees: National Taiwan University of Science and Technology, Taipei (TW); NATIONAL TAIWAN NORMAL UNIVERSITY, Taipei (TW); National Taiwan University, Taipei (TW)

( * ) Notice: Subject to any disclaimer, the term of this patent is extended or adjusted under 35 U.S.C. 154(b) by 158 days.

(21) Appl. No.: 16/747,504

(22) Filed: Jan. 20, 2020

(65) Prior Publication Data
US 2021/0171829 A1    Jun. 10, 2021

(30) Foreign Application Priority Data
Dec. 4, 2019    (TW) .............................. 108144231

(51) Int. Cl.
*C09K 11/77*      (2006.01)
*C09K 11/66*      (2006.01)

(52) U.S. Cl.
CPC ........ *C09K 11/7704* (2013.01); *C09K 11/664* (2013.01)

(58) Field of Classification Search
CPC .......................... C09K 11/7704; C09K 11/664
See application file for complete search history.

(56) References Cited

U.S. PATENT DOCUMENTS

2017/0027168 A1*   2/2017   Heath ..................... A61P 17/00

FOREIGN PATENT DOCUMENTS

| CN | 103525414 | 1/2014 |
|---|---|---|
| CN | 104861958 | 2/2017 |
| CN | 106750427 | 5/2017 |
| CN | 109266343 | 1/2019 |
| CN | 110234181 | 9/2019 |
| TW | I642760 | 12/2018 |
| TW | I650398 | 2/2019 |

OTHER PUBLICATIONS

Chen. Tunable self-assembly structure of graphene oxide/cellulose nanocrystal hybrid films fabricated by vacuum filtration technique. RSC Adv., 2014, 4, 39301-39304 (Year: 2014).*
"Office Action of Taiwan Counterpart Application", dated Jun. 11, 2020, p. 1-p. 6.

* cited by examiner

*Primary Examiner* — Matthew E. Hoban
(74) *Attorney, Agent, or Firm* — JCIPRNET

(57) ABSTRACT

Provided is a method for synthesizing a perovskite quantum dot film, including: preparing a cellulose nanocrystal (CNC) solution, wherein the CNC solution includes a plurality of CNCs with sulfate groups; preparing a precursor solution; mixing the CNC solution and the precursor solution to form a mixed solution; and filtering and drying the mixed solution to form a perovskite quantum dot film.

8 Claims, 9 Drawing Sheets

METHOD FOR SYNTHESIZING PEROVSKITE QUANTUM DOT FILM

CROSS-REFERENCE TO RELATED APPLICATION

This application claims the priority benefit of Taiwan application serial no. 108144231, filed on Dec. 4, 2019. The entirety of the above-mentioned patent application is hereby incorporated by reference herein and made a part of this specification.

BACKGROUND OF THE INVENTION

1. Field of the Invention

The invention relates to a method for synthesizing a quantum dot film, and in particular to a method for synthesizing a perovskite quantum dot film.

2. Description of Related Art

Because of the attractive properties of perovskite quantum dots (PQDs), such as tunable band gap, high photoluminescence quantum yield (PLQY), high absorptivity and narrow emission peak, they have become a promising material that can be applied to various industries such as displays, light-emitting diodes and solar cells. However, PQDs are easily degraded under the conditions of rich oxygen and water vapor, high temperature and continuous light irradiation, which reduces the stability of PQDs and greatly limits the potential application of PQDs.

In the prior art, the capping ligands such as oleic acid and/or oleylamine can be used to stabilize the surfaces of PQDs. However, the capping ligands are not tightly bound to the surfaces of PQDs, but are in a fast exchange state between a bound state and a free state. Under the continuous irradiation of light, the capping ligands tend to diffuse into the solvent, which makes adjacent PQDs agglomerate together, leading to fluorescence quenching. Therefore, people skilled in the art will devote themselves to the research and development of PQDs with long-term stability for better application to various fields of electronic industry.

SUMMARY OF THE INVENTION

The invention provides a method for synthesizing a perovskite quantum dot film, which can effectively prevent perovskite quantum dots from being degraded in humid environments, high-polarity gases and high-energy lights, thereby improving the service life of the perovskite quantum dots film.

The invention provides a method for synthesizing a perovskite quantum dot film, which includes: preparing a cellulose nanocrystal (CNC) solution, where the CNC solution includes a plurality of CNCs with sulfate groups; preparing a precursor solution; mixing the CNC solution and the precursor solution to form a mixed solution; and filtering and drying the mixed solution to form a perovskite quantum dot film.

In one embodiment of the invention, preparing the CNC solution includes: dissolving CNC powder in water to form a first solution; and dissolving the first solution in an organic solvent to form the CNC solution.

In one embodiment of the invention, flexibility and a tensile property of the perovskite quantum dot film increase with an increase of a water content of the first solution.

In one embodiment of the invention, the perovskite quantum dot film includes a plurality of perovskite quantum dots uniformly distributed among the CNCs.

In one embodiment of the invention, the sulfate groups of the CNCs are connected with the perovskite quantum dots to improve stability of the perovskite quantum dot film.

In one embodiment of the invention, the perovskite quantum dot is represented by the following formula (1):

$$ABX_3 \qquad (1),$$

where A includes an inorganic cation or an organic amine, the inorganic cation includes Li, Na, K, Rb, Cs or a combination thereof, and the organic amine includes ammonia, methylamine, formamidine acetate, formamidine amine, formamidine, ethylenediamine, dimethylamine, imidazole, acetamidine, propylamine, isopropylamine, trimethylenediamine, ethylamine, butylamine, isobutylamine, tert-butylamine, diethylamine, 5-aminovaleric acid, 2-thiophene methylamine, hexylamine, aniline, benzylamine, phenylethylamine, octylamine, decylamine, dodecylamine, tetradecylamine, hexadecylamine, octadecylamine, eicosamine or a combination thereof; B includes Cd, Co, Cr, Cu, Fe, Ge, Pb, Sn or a combination thereof; and X includes halogen.

In one embodiment of the invention, preparing the precursor solution includes: providing a first precursor including A and X; providing a second precursor including B and X; and adding the first precursor and the second precursor into an organic solvent and uniformly mixing the first precursor, the second precursor into the organic solvent.

In one embodiment of the invention, a wavelength of light emitted by the perovskite quantum dots increases with an increase of a concentration of the precursor solution.

In one embodiment of the invention, each CNC has a length of 100 nm to 300 nm and a width of 3 nm to 20 nm.

In one embodiment of the invention, a molecular weight of the CNC is 14700 to 27850.

Based on the above, the present embodiment provides a method for synthesizing a perovskite quantum dot film, in which the sulfate groups of the plurality of CNCs are connected with a plurality of perovskite quantum dots, such that the plurality of perovskite quantum dots is uniformly distributed among the plurality of CNCs, thereby improving the stability of the perovskite quantum dot film.

In addition, the synthesis method provided by the present embodiment can improve the flexibility and tensile property of the perovskite quantum dot film by adjusting the water content of the CNC solution. Besides, the synthesis method provided by the present embodiment can also adjust the wavelength of the light emitted by the perovskite quantum dots by adjusting the concentration of the precursor solution.

DESCRIPTION OF THE EMBODIMENTS

Figure 1:
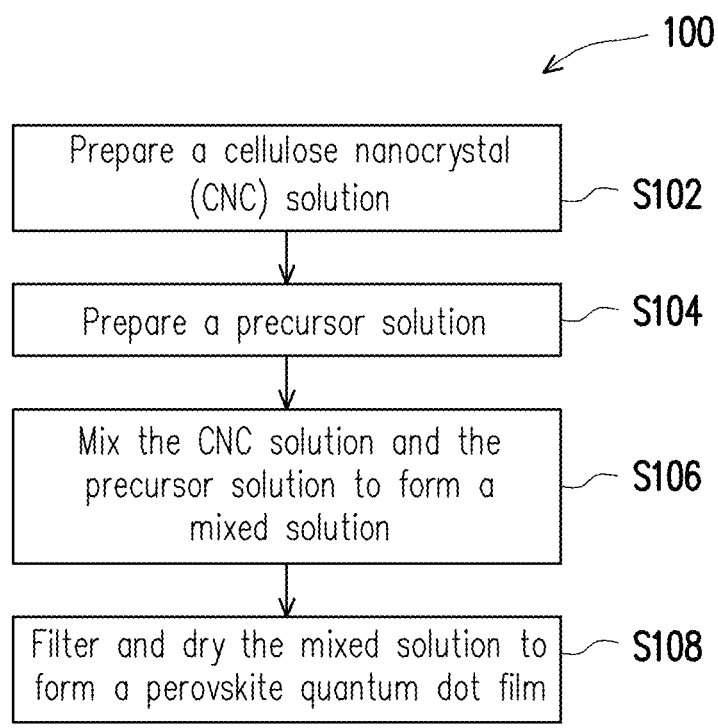
FIG. 1 is a manufacturing flowchart of a perovskite quantum dot film according to an embodiment of the invention.

The present invention will be fully explained with reference to the drawings of the embodiments. However, the present invention may also be embodied in various different forms and should not be limited to the embodiments described in the specification. Thicknesses of layers or regions may be enlarged for clarity. Same or like reference numerals are used to indicate same or like elements. Details may be omitted in the description of the following sections.

In this specification, a range represented by "from a numerical value to another numerical value" is a summary representation that avoids enumerating all numerical values in this range one by one. Therefore, recording a specific numerical range is equivalent to disclosing any numerical value within this numerical range and a smaller numerical range defined by another numerical value within this numerical range, as if the numerical value and the smaller numerical range are explicitly written in the specification. For example, recording a range of "particle diameter ranging from 5 nm to 15 nm" is equivalent to disclosing a range of "particle diameter ranging from 10 nm to 13 nm", regardless of whether other numerical values are listed in the specification.

FIG. 1 is a manufacturing flowchart of a perovskite quantum dot film according to an embodiment of the invention. FIG. 2A to FIG. 2E are schematic diagrams of a manufacturing process of the perovskite quantum dot film in FIG. 1.

Referring to FIG. 1, an embodiment of the invention provides a manufacturing process 100 of a perovskite quantum dot film, which includes steps S102, S104, S106 and S108. Firstly, step S102 of preparing a CNC solution, is performed. Since it is difficult for CNC powder to dissolve in an organic solvent, the CNC powder is firstly dissolved in water (such as deionized water) to form a first solution. In some embodiments, a content of the CNC powder may be between 1 wt % and 20 wt %, for example, about 5 wt %. Then, the first solution is dissolved in the organic solvent to form the CNC solution. In some embodiments, a content of the first solution described above may be between 0.5 wt % and 10 wt %, for example, about 1 wt %. The organic solvent may be dimethylformamide (DMF), dimethylsulfoxide (DMSO), trimethyl phosphate (TMP), triethyl phosphate (TEP), N-methylpyrrolidone (NMP), dimethylacetamide (DMAC) or a combination thereof.

It is worth noting that, in the present embodiment, the CNC solution includes a plurality of CNCs with sulfate groups. For example, the CNC may be represented by the following structure:

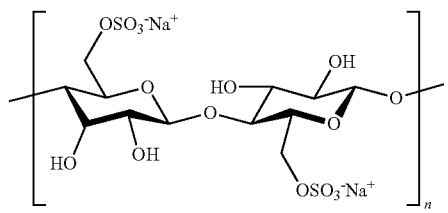

Figure 2A:
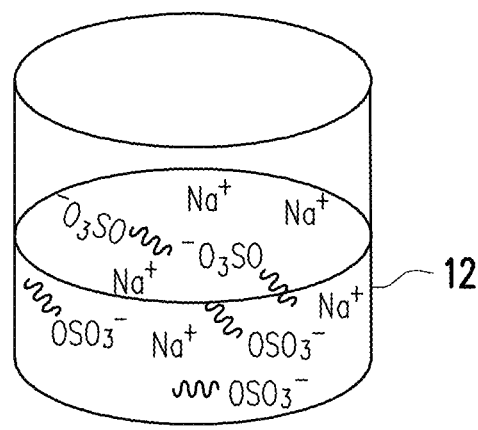
FIG. 2A to FIG. 2E are schematic diagrams of a manufacturing process of the perovskite quantum dot film in FIG. 1.

In this case, as illustrated in FIG. 2A, the CNC solution 12 includes a plurality of CNCs with sulfate groups (—O—$SO_3^-$) and sodium ion ($Na^+$) dissociated in the organic solvent. In some embodiments, the CNCs may be needlelike nanocrystals with a length of about 100 nm to 300 nm and a width of about 3 nm to 20 nm. It is worth noting that in the present embodiment, a molecular weight of the CNCs is about 14700 to 27850. In other words, a molecular weight of the CNCs in the present embodiment is far smaller than that of general cellulose, which can more closely surround the perovskite quantum dots formed subsequently, thus preventing the perovskite quantum dots from aggregating. In some embodiments, the CNCs may be obtained by hydrolyzing biomass (for example, by bleaching wood pulp, cotton, sea squirts, bacteria, etc.) with strong acids.

Next, step S104 of preparing a precursor solution is performed. Specifically, preparing the precursor solution may include the following steps: providing a first precursor with a first inorganic halide; providing a second precursor with a second inorganic halide; and adding the first precursor and the second precursor to an organic solvent and uniformly mixing the first precursor, the second precursor and the organic solvent.

Figure 2B:
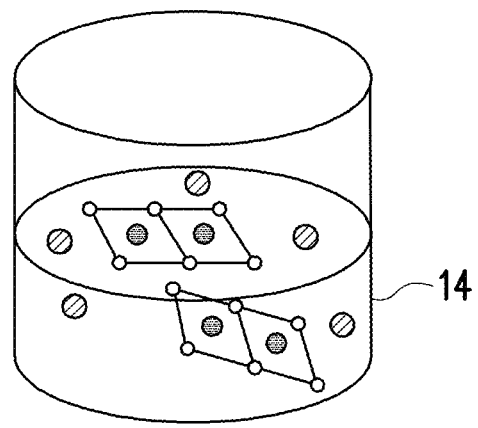

In some embodiments, the first inorganic halide may be any one or a combination of halides of metals Li, Na, K, Rb and Cs. The second inorganic halide may be any one or a combination of halides of metals Cd, Co, Cr, Cu, Fe, Ge, Pb and Sn. The organic solvent may be dimethylformamide (DMF), dimethylsulfoxide (DMSO), trimethyl phosphate (TMP), triethyl phosphate (TEP), N-methylpyrrolidone (NMP), dimethylacetamide (DMAC) or a combination thereof. In some embodiments, a Moore concentration of the first inorganic halide in the precursor solution is 0.01 M to 0.08 M, and is about 0.04 M. A Moore concentration of the second inorganic halide in the precursor solution is 0.01 M to 0.08 M, and is about 0.04 M. In the present embodiment, the first inorganic halide is different from the second inorganic halide. For example, the first precursor may be CsBr, the second precursor may be $PbBr_2$, and the organic solvent may be DMF. In this case, as illustrated in FIG. 2B, CsBr in the precursor solution 14 is dissociated into $CS^+$ and $Br^-$, while $PbBr_2$ reacts with Br to form a layered structure of $PbBr_6^-$.

In one alternative embodiment, the first precursor may include an organic amine halide, which may be any one or a combination of halides of ammonia, methylamine, formamidine acetate, formamidine amine, formamidine, ethylenediamine, dimethylamine, imidazole, acetamidine, propylamine, isopropylamine, trimethylenediamine, ethylamine, butylamine, isobutylamine, tert-butylamine, diethylamine, 5-aminovaleric acid, 2-thiophene methylamine, hexylamine, aniline, benzylamine, phenylethylamine, octylamine, decylamine, dodecylamine, tetradecylamine, hexadecylamine, octadecylamine, eicosamine. For example, the first precursor may be methanaminium bromide (MABr).

Figure 2C:
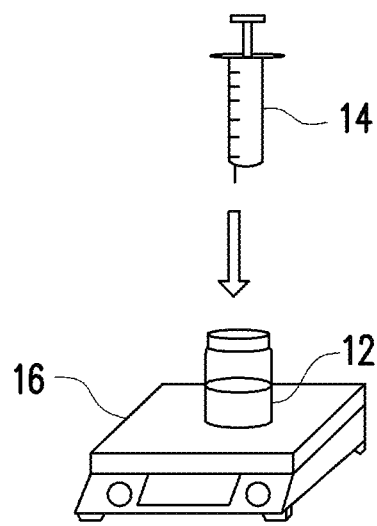

Next, step S106 of mixing the CNC solution and the precursor solution to form a mixed solution is performed. In some embodiments, as illustrated in FIG. 2C, the precursor solution 14 is added to the CNC solution 12, and the precursor solution 14 and the CNC solution 12 are stirred for about 30 min by using a stirrer 16 (such as an electromagnetic stirrer or an ultrasonic stirrer), such that the CNC solution 12 is uniformly mixed with the precursor solution 14 and a viscosity of the solution is increased.

Figure 2D:
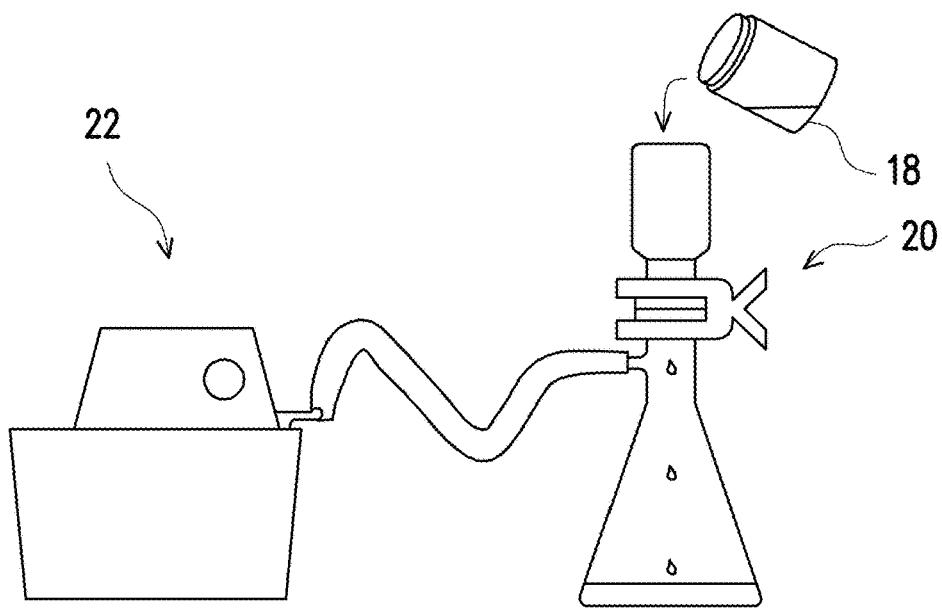

Finally, step S108 of filtering and drying the mixed solution to form a perovskite quantum dot film is performed. Specifically, as illustrated in FIG. 2D, the uniformly stirred mixed solution 18 is poured into a suction filtration device 20 (for example, an alumina ceramic filter membrane with a pore diameter of 20 nm is used). In some embodiments, the mixed solution cannot contain bubbles, so as to avoid the situation that the bubbles will make the perovskite quantum dot film formed later contain air such that the service life is reduced. In addition, a water pump or a mechanical pump 22 may also be used to suck air to accelerate a filtration speed and increase the uniformity of the film until the film is dry and is separated from the filtration membrane. Then, the film is taken down and dried at 60° C. to 80° C. (about 75° C.) for 5 min to 20 min to complete the manufacturing of the perovskite quantum dot film. Although the perovskite quantum dot film is formed by suction filtration, the invention is not limited thereto. In other embodiments, the perovskite quantum dot film may also be formed by methods such as spin coating, dip coating, electrostatic spinning, solution settling, spray coating and casting.

Figure 2E:
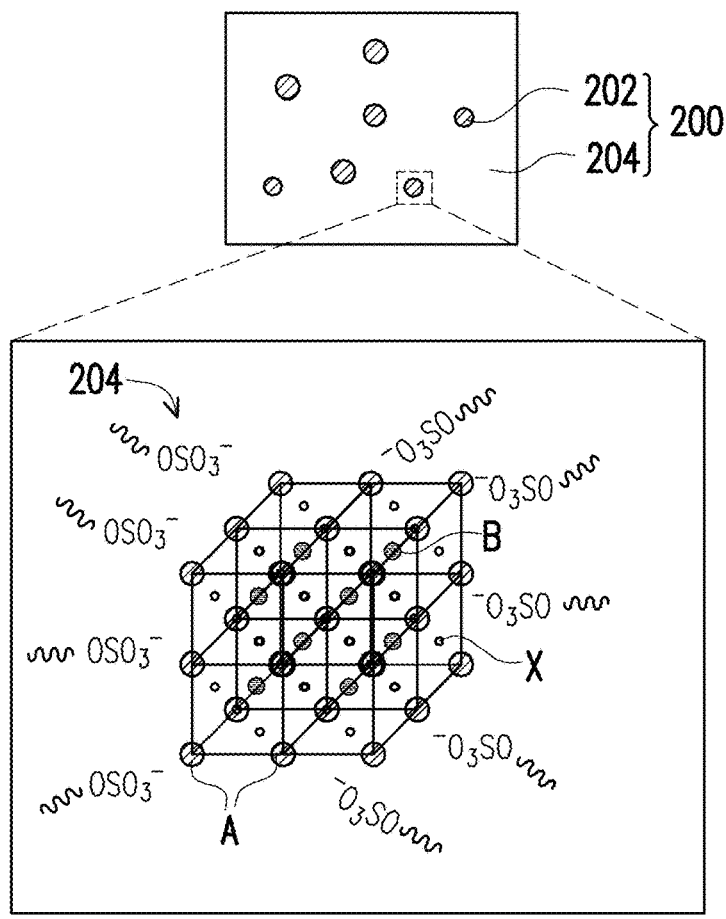

FIG. 2E illustrates a perovskite quantum dot film 200 manufactured by adopting the manufacturing process 100. Specifically, the perovskite quantum dot film 200 includes a plurality of perovskite quantum dots 202 uniformly distributed among the CNCs 204. In some embodiments, the perovskite quantum dots 202 can be represented by the following formula (1):

$$ABX_3 \tag{1}$$

where A includes an inorganic cation or an organic amine, the inorganic cation includes Li, Na, K, Rb, Cs or a combination thereof, and the organic amine includes ammonia, methylamine, formamidine acetate, formamidine propionate, formamidine, ethylenediamine, dimethylamine, imidazole, acetamidine, propylamine, isopropylamine, trimethylenediamine, ethylamine, butylamine, isobutylamine, tert-butylamine, diethylamine, 5-aminovaleric acid, 2-thiophene methylamine, hexylamine, aniline, benzylamine, phenylethylamine, octylamine, decylamine, dodecylamine, tetradecylamine, hexadecylamine, octadecylamine, eicosamine or a combination thereof; B includes Cd, Co, Cr, Cu, Fe, Ge, Pb, Sn or a combination thereof; and X includes halogen, such as F, Cl, Br or I.

As illustrated in an enlarged part of FIG. 2E, the metal cations B and the halogen ions X form an octahedral structure, while the cations A are located in the gaps of the octahedron. It is worth noting that in the present embodiment, the perovskite quantum dot film 200 with the CNCs 204 is synthesized by adopting a non-template method. Compared with the template method, the CNCs 204 in the present embodiment can be bonded with the perovskite quantum dots 202 to improve stability of the perovskite quantum dot film 200. Specifically, the sulfate groups (—O—SO$_3^-$) of the CNCs 204 are connected with unpaired electrons (empty orbitals) on surfaces of the perovskite quantum dots 202 to stabilize a structure of the perovskite quantum dots 202, thereby improving the stability of the perovskite quantum dot film 200. The CNCs 204 can also effectively prevent the perovskite quantum dots 202 from being degraded in humid environments, high-polarity gases and high-energy lights, thus improving the service life of the perovskite quantum dot film 200. In addition, the sulfate groups of the CNCs 204 can also restrict growth of perovskite crystals, thereby controlling a particle size of the perovskite quantum dots 202. In addition, visible light (about 520 nm to 800 nm) transmittance of the perovskite quantum dot film 200 in the present embodiment may be greater than or equal to 70%. In one embodiment, the visible light transmittance of the perovskite quantum dot film 200 in the present embodiment is about 70% to 80%. The perovskite quantum dot film 200 in the present embodiment has higher visible light transmittance than the perovskite quantum dot film formed by adopting the template method.

In order to prove the realizability of the invention, several examples are listed below to further describe the perovskite quantum dots of the invention. Although the following experiments are described, without going beyond the scope of the invention, the materials used, the amount and the ratio thereof, the treatment details, the treatment flow and the like may be appropriately changed. Therefore, the invention should not be restrictively explained based on the experiments described below.

Experimental Example 1

CNC powder (purchased from Celluforce) was dissolved in deionized water to form a first solution with a concentration of 5 wt %. Next, a first solution was dropped into DMF (purchased from Aencore, with a purity of 99.5%) to form a CNC solution with a concentration of 1 wt %. Then, 0.4 mmol of CsBr (purchased from Alfa Aesar, with a purity of 99%) and 0.4 mmol of PbBr$_2$ (purchased from FMPV, with a purity of 98%) were put into a flask, 20 ml of DMF (purchased from Aencore, with a purity of 99.5%) were added, and the mixture was mixed uniformly to form a CsPbBr$_3$ precursor solution. Next, 20 ml of CsPbBr$_3$ precursor solution was mixed with 10 ml of the CNC solution and stirred at room temperature (about 25° C.) for at least 30 min to form a mixed solution. Then, the mixed solution was poured into a Buchner funnel for vacuum filtration and drying to form a CsPbBr$_3$ inorganic perovskite quantum dot film (hereinafter referred to as IPQD of Experimental Example 1). Then, the IPQD of Experimental Example 1 was subjected to PL emission spectrum, UV-vis absorption spectrum and XRD analysis. The results are as illustrated in FIG. 3A to FIG. 3D. Then, the IPQD of Experimental Example 1 was subjected to TEM, HRTEM and FFT analysis. The results are as illustrated in FIG. 4A to FIG. 4C.

Figure 3A:
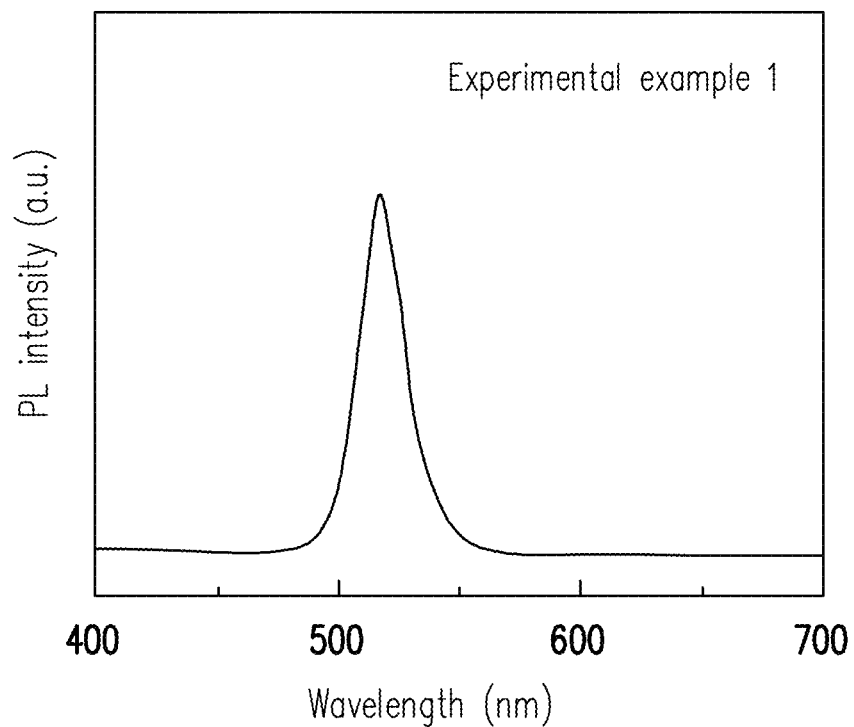
FIG. 3A is a photoluminescence (PL) emission spectrum of a perovskite quantum dot film in Experimental Example 1.
Figure 3B:
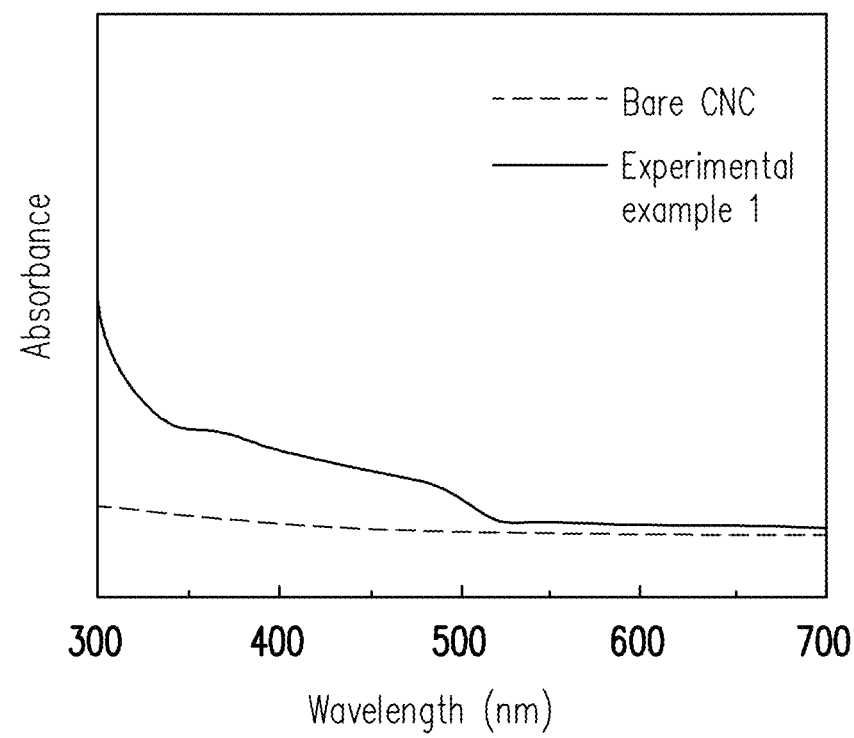
FIG. 3B is a UV-vis absorption spectrum of the perovskite quantum dot film in Experimental Example 1.
Figure 3C:
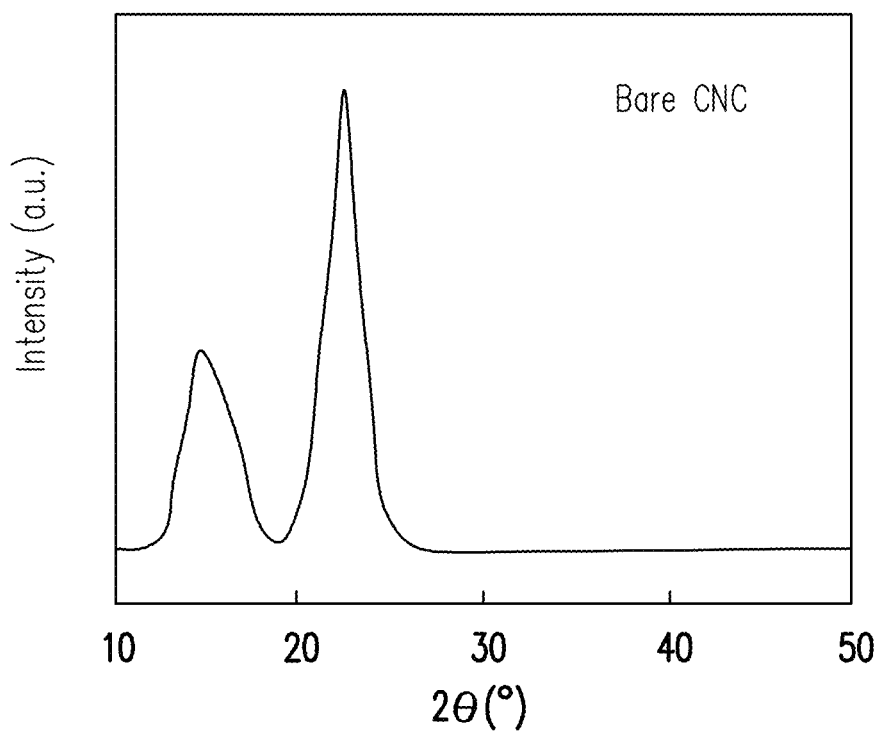
FIG. 3C is an X-Ray Diffraction (XRD) pattern of bare CNC paper.
Figure 3D:
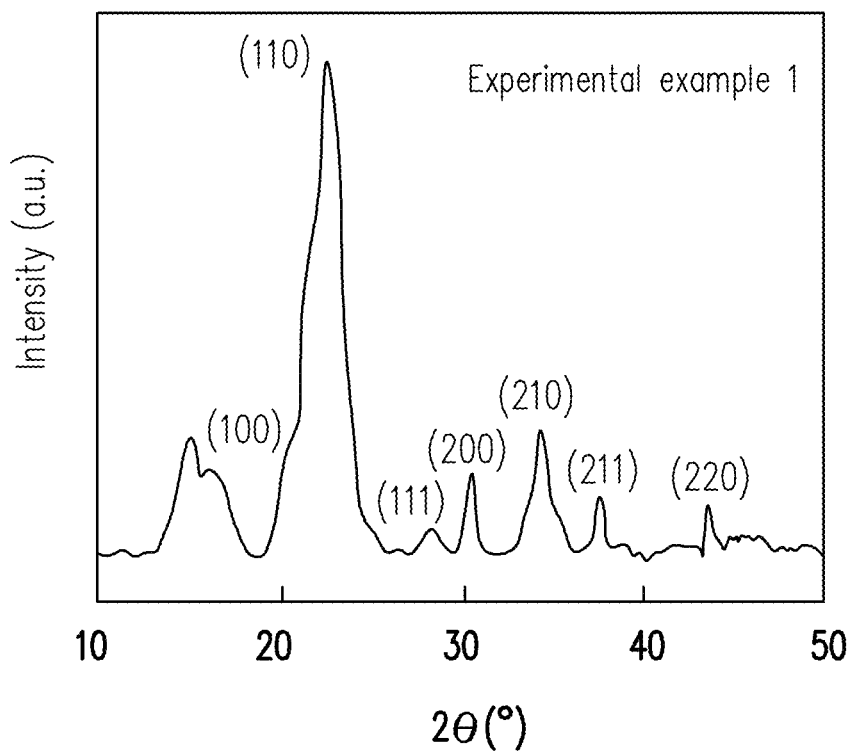
FIG. 3D is an XRD pattern of the perovskite quantum dot film in Experimental Example 1.
Figure 4C:
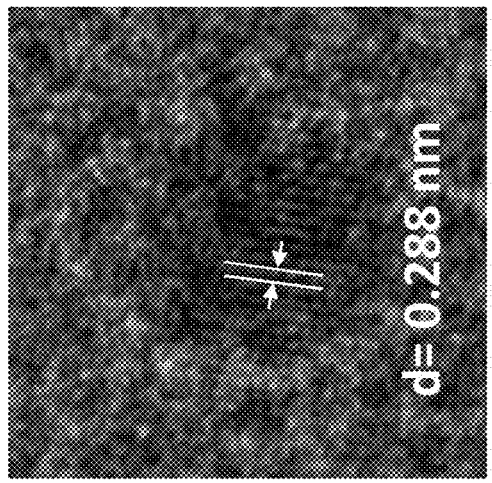
FIG. 4A to FIG. 4C are a Transmission Electron Microscope (TEM) image, a High Resolution Transmission Electron Microscope (HRTEM) image and a Fast Fourier Transform (FFT) image of the perovskite quantum dot film in Experimental Example 1.

Referring to FIG. 3A, under the irradiation of a 350 nm exciting light, the IPQD of Experimental Example 1 at 518 nm has an emission peak with a full width at half maximum (FWHM) of 22 nm. This means that the IPQD of Experimental Example 1 can at least emit a green light. In addition, as illustrated in FIG. 3B, absorbance of the IPQD of Experimental Example 1 in a short wavelength range (300 nm to 515 nm) is higher than that of bare CNC paper, which indicates that the IPQD of Experimental Example 1 has good absorbance and light conversion property. In addition, from FIG. 3C and FIG. 3D, it can be seen that an XRD pattern of the IPQD in Experimental Example 1 illustrates that there are 7 peaks at 16°, 22°, 28°, 30°, 35°, 38° and 44°. In Experimental Example 1, the peaks of the IPQD at 16° and 22° overlap with the peaks of the XRD of the bare CNC paper at 16° and 22° respectively, corresponding to a (110)

side and a (200) side of the paper. FIG. 3A to FIG. 3D above indicate that the IPQD of Experimental Example 1 has been successfully synthesized, while the CNCs cap or passivate surfaces of $CsPbBr_3$ perovskite quantum dots.

Figure 4B:
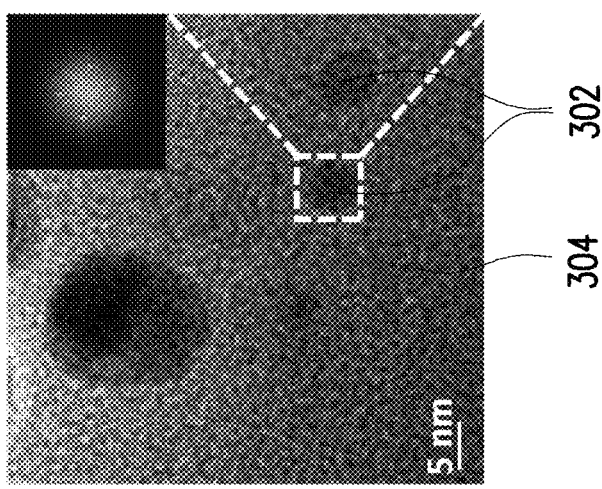
Figure 4A:
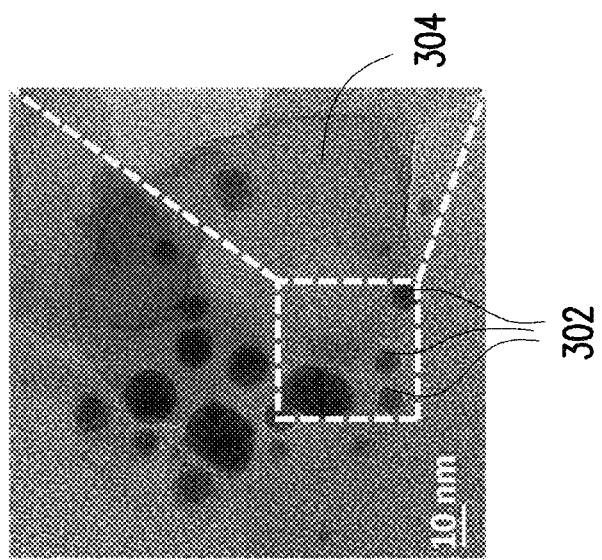

In addition, FIG. 4A and FIG. 4B illustrate TEM and HRTEM images of the IPQD of Experimental Example 1, where a plurality of $CsPbBr_3$ perovskite quantum dots 302 is separated from each other and surrounded by CNCs 304. As illustrated in FIG. 4B, a particle size of $CsPbBr_3$ perovskite quantum dots 302 is about 5 nm. FIG. 4C illustrates an enlarged HRTEM image of a single $CsPbBr_3$ perovskite quantum dot, and a lattice spacing of $CsPbBr_3$ perovskite quantum dots calculated from FFT is about 0.288 nm, which corresponds to the (200) side of $CsPbBr_3$. In other words, the quantum dots manufactured by adopting the above manufacturing process are indeed $CsPbBr_3$ perovskite quantum dots.

Comparative Example 1

Figure 5C:
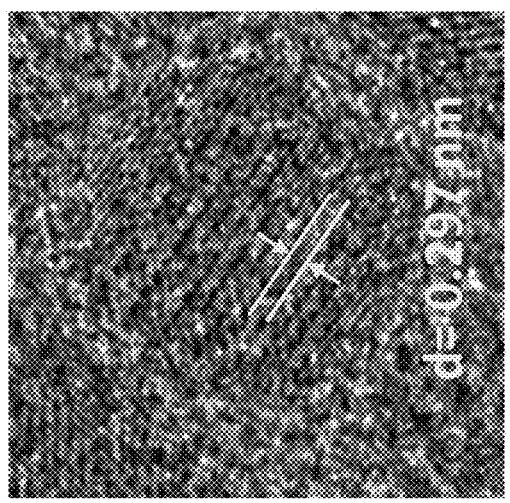
FIG. 5A to FIG. 5C are a TEM image, an HRTEM image and an FFT image of a perovskite quantum dot film in Comparative Example 1.

0.05 M of a $CsPbBr_3$ solution was prepared in 5 ml of DMF (purchased from Aencore, with a purity of 99.5%) and mixed with 200 μl of oleic acid (purchased from Showa, with a purity of 99%) and 50 μl of oleylamine (purchased from ACROS Organics, with a purity of 90%) to form a precursor solution. Then, 0.5 ml of the precursor solution was dropped into 10 ml of toluene (purchased from Alfa Aesar, with a purity of 99.5%) to form a bright yellow green $CsPbBr_3$ perovskite quantum dot colloid solution. Then, the colloid solution was washed with methyl acetate with a volume ratio of 1:1 and centrifuged at 7000 rpm for 10 min to remove supernatant (including excess oleic acid and oleylamine). Then, toluene was used to redistribute precipitate, and the cleaned $CsPbBr_3$ inorganic perovskite quantum dot colloid solution (hereinafter referred to as IPQD of Comparative Example 1) was dropped onto a glass substrate for XRD, TEM, HRTEM and FFT analysis. The results are as illustrated in FIG. 5A to FIG. 5C.

Figure 5B:
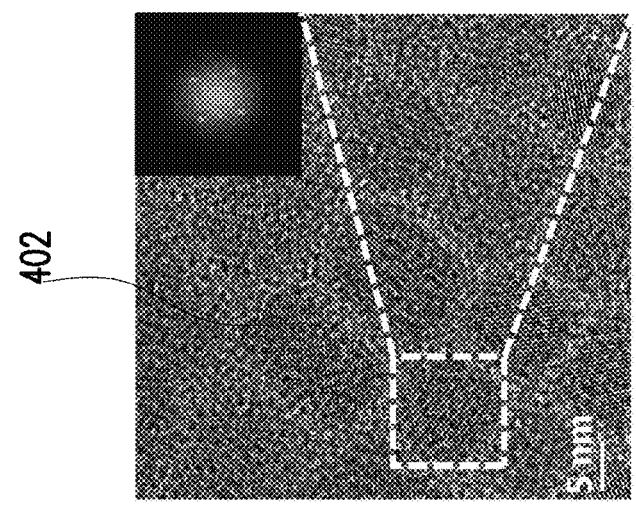
Figure 5A:
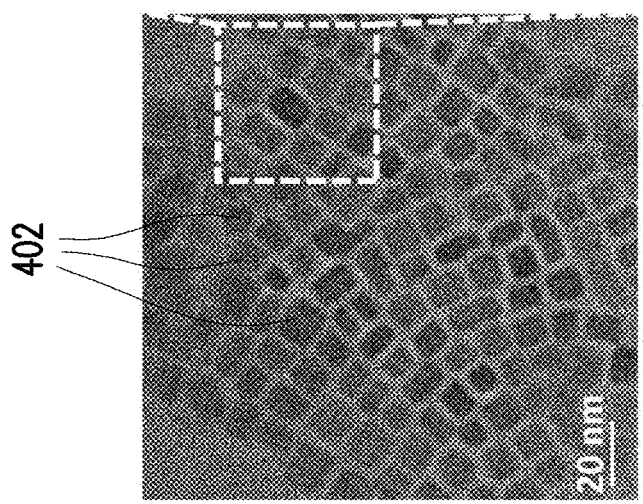

FIG. 5A and FIG. 5B illustrate TEM and HRTEM images of the IPQD of Comparative Example 1, where a plurality of $CsPbBr_3$ perovskite quantum dots 402 is arranged side by side. As illustrated in FIG. 5B, a particle size of $CsPbBr_3$ perovskite quantum dots 402 is about 10 nm. Compared with the IPQD of Experimental Example 1, a single quantum dot 402 of Comparative Example 1 is rectangular and larger in size. FIG. 5C illustrates an enlarged HRTEM image of a single $CsPbBr_3$ perovskite quantum dot, and a lattice spacing of the $CsPbBr_3$ perovskite quantum dot calculated from FFT is about 0.297 nm. From FIG. 4A and FIG. 5A, it can be seen that dispersivity of the IPQD of Comparative Example 1 is different from that of Experimental Example 1. Specifically speaking, $CsPbBr_3$ perovskite quantum dots 402 of Comparative Example 1 are arranged side by side, while $CsPbBr_3$ perovskite quantum dots 302 of Experimental Example 1 are uniformly dispersed in CNCs 304 and are not arranged side by side. Configuration of the IPQD in Experimental Example 1 can prevent aggregation caused by heat or light.

Experimental Example 2

A 1 wt % CNC solution was prepared through the steps in Experimental Example 1. Then, CsBr and $PbBr_2$ were mixed by using chlorine (Cl) with a Cl:Br ratio of 1:1 to form a $CsPb(Br/Cl)_3$ precursor solution. Next, 20 ml of the $CsPb(Br/Cl)_3$ precursor solution was mixed with 10 ml of the CNC solution and stirred at room temperature (about 25° C.) for at least 30 min to form a mixed solution. Then, the mixed solution was poured into a Buchner funnel for vacuum filtration and drying to form a $CsPb(Br/Cl)_3$ inorganic perovskite quantum dot film (hereinafter referred to as IPQD of Experimental Example 2). Then, the IPQD of Experimental Example 2 was subjected to PL emission spectrum analysis. The results are as illustrated in FIG. 6.

Experimental Example 3

A 1 wt % CNC solution was prepared through the steps in Experimental Example 1. Then, CsBr and $PbBr_2$ were mixed by using iodine (I) with an I:Br ratio of 1:1 to form a $CsPb(Br/I)_3$ precursor solution. Next, 20 ml of the $CsPb(Br/I)_3$ precursor solution was mixed with 10 ml of the CNC solution and stirred at room temperature (about 25° C.) for at least 30 min to form a mixed solution. Then, the mixed solution was poured into a Buchner funnel for vacuum filtration and drying to form a $CsPb(Br/I)_3$ inorganic perovskite quantum dot film (hereinafter referred to as IPQD of Experimental Example 3). Then, the IPQD of Experimental Example 3 was subjected to PL emission spectrum analysis. The results are as illustrated in FIG. 6.

Figure 6:
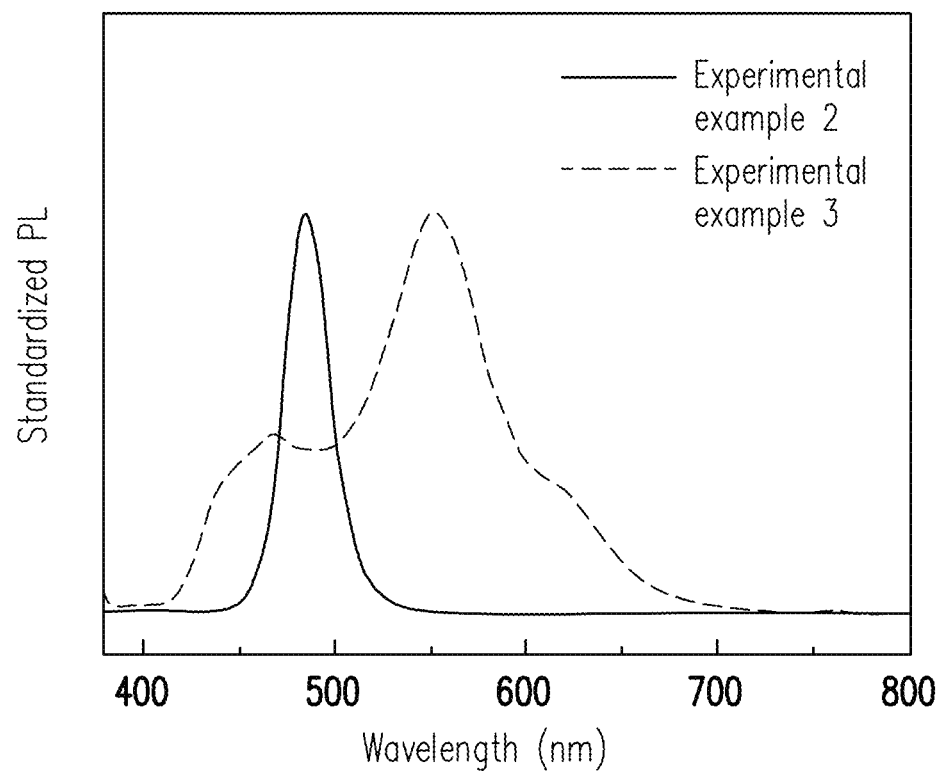
FIG. 6 is a PL emission spectrum of perovskite quantum dot films in Experimental Examples 2-3.

Referring to FIG. 6, compared with a 518 nm emission peak of the IPQD ($CsPbBr_3$) of Experimental Example 1 in FIG. 3A, the IPQD ($CsPb(Br/Cl)_3$) of Experimental Example 2 mixed with Cl produces a blue shift phenomenon, which has an emission peak with an FWHM of 26.9 nm at 484 nm. In addition, the IPQD ($CsPb(Br/I)_3$) of Experimental Example 3 mixed with I produces a red shift phenomenon, which has an emission peak with an FWHM of 76.07 nm at 550 nm. The results in FIG. 6 indicate that a type of a halogen of the IPQD can be adjusted to control a wavelength of light emitted by the IPQD to achieve a full visible light spectrum.

Experimental Example 4

A 1 wt % CNC solution was prepared through the steps in Experimental Example 1. Then, an $MAPbBr_3$ precursor solution with different volumes (for example, 0.4 ml, 0.6 ml, 0.8 ml and 1.0 ml) was mixed with 20 ml of the CNC solution and stirred at room temperature (about 25° C.) for at least 30 min to form a mixed solution. Then, the mixed solution was poured into a Buchner funnel for vacuum filtration and drying to form an $MAPbBr_3$ inorganic perovskite quantum dot film with a different concentration of the precursor (hereinafter referred to as IPQD of Experimental Example 4). Then, the IPQD of Experimental Example 4 was subjected to PL emission spectrum analysis. The results are as illustrated in FIG. 7.

Figure 7:
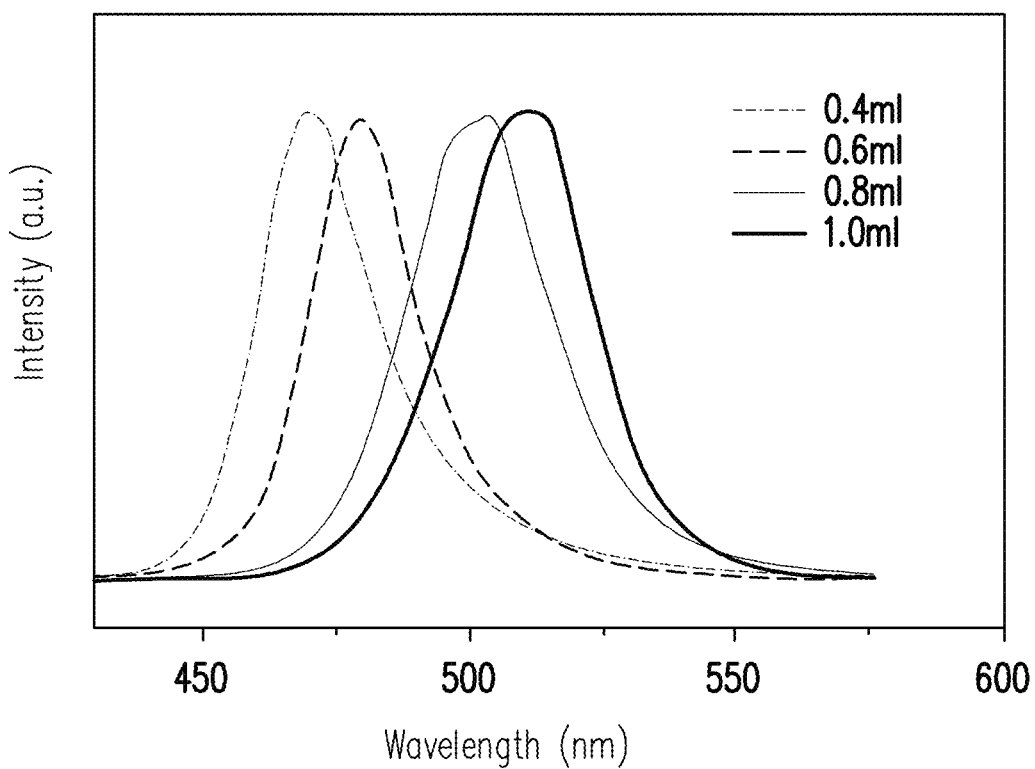
FIG. 7 is a PL emission spectrum of a perovskite quantum dot film in Experimental Example 4.

Referring to FIG. 7, an emission peak of the IPQD can be easily adjusted from 510 nm to 469 nm by gradually reducing the volume of the precursor from 1.0 ml to 0.4 ml. In other words, when a concentration of the halogen increases (or decreases), a wavelength of light emitted by the IPQD also increases (or decreases). Therefore, the present embodiment can control a wavelength of light emitted by the IPQD by changing the concentration of the halogen of the precursor to achieve a full visible light spectrum. This also indicates color adjustability of the IPQD. In some embodiments, the halogen concentration has an upper limit value, and when the concentration of the halogen is too high, the crystals will grow into crystals too large to emit light. For example, Cl can achieve a maximum emission wavelength of 480 nm; Br can achieve a maximum emission wavelength of 520 nm; and I can achieve a maximum emission wavelength of 750 nm.

Experimental Example 5

CNC powder (purchased from Celluforce) was dissolved in deionized water to form a 5 wt % first solution. Then, the first solution was dropped into DMF (purchased from Aencore, with a purity of 99.5%) to form a 0.5 wt % CNC solution. Then, 3.5 mmol of MABr (purchased from FMPV, with a purity of 98%) and 3.5 mmol of $PbBr_2$ (purchased from FMPV, with a purity of 98%) were added into a flask containing 7 ml of DMF (purchased from Aencore, with a purity of 99.5%) and stirred uniformly to form a $MAPbBr_3$ precursor solution. Next, 1 ml of $MAPbBr_3$ precursor solution was mixed with 20 ml of CNC solution and stirred at room temperature (about 25° C.) for at least 30 min to form a mixed solution. Then, the mixed solution was poured into a Buchner funnel for vacuum filtration for 24 h to form a dry $MAPbBr_3$ hybrid perovskite quantum dot film (hereinafter referred to as HPQD of Experimental Example 5). Then, the HPQD of Experimental Example 5 was subjected to stability test. The results are as illustrated in FIG. 8A to FIG. 8C.

Comparative Example 2

0.08 M of an $MAPbBr_3$ solution was prepared in 5 ml of DMF (purchased from Aencore, with a purity of 99.5%) and mixed with 200 μl of oleic acid (purchased from Showa, with a purity of 99%) and 50 μl of oleylamine (purchased from ACROS Organics, with a purity of 90%) to form a precursor solution. Then, 0.5 ml of the precursor solution was dropped into 10 ml of toluene (purchased from Alfa Aesar, with a purity of 99.5%) and centrifuged at 7000 rpm for 10 min for purification, thus forming an $MAPbBr_3$ hybrid perovskite quantum dot film (hereinafter referred to as HPQD of Comparative Example 2). Then, the HPQD of Comparative Example 2 was subjected to stability test. The results are as illustrated in FIG. 8A to FIG. 8C.

Figure 8A:
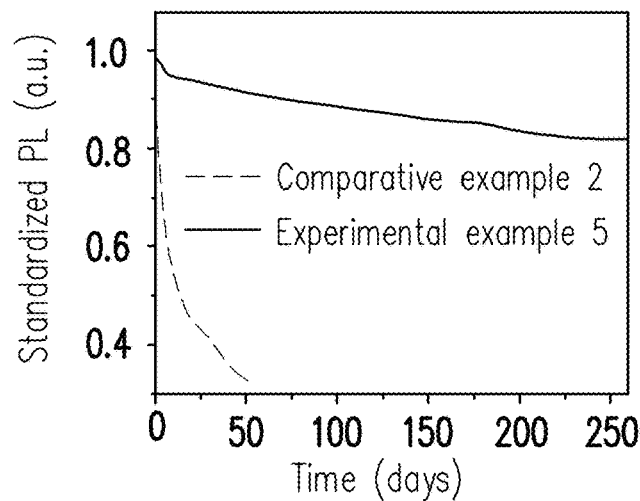
FIG. 8A to FIG. 8C are respectively luminous intensities of Experimental Example 5 and Comparative Example 2 in high-humidity, strong-light and high-temperature environments.
Figure 8B:
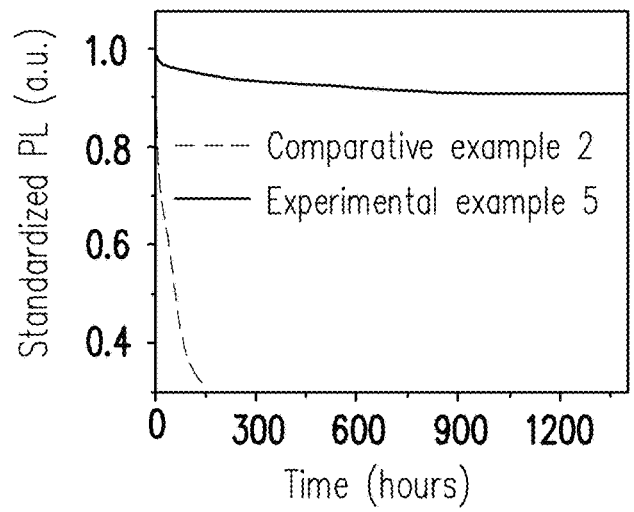
Figure 8C:
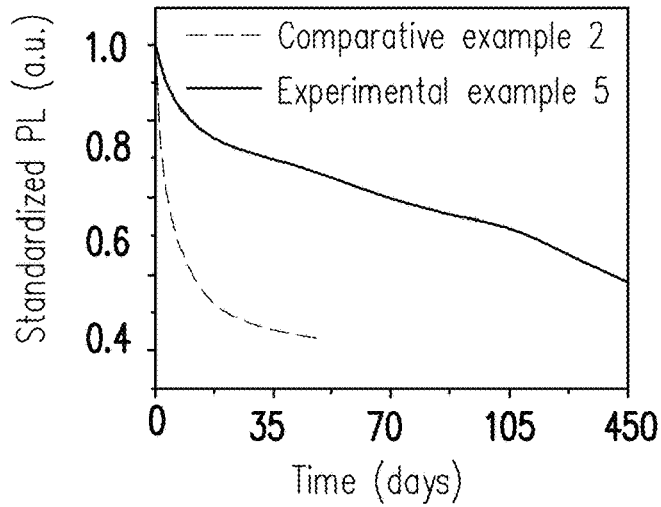

FIG. 8A to FIG. 8C respectively illustrate the relationship between relative PL intensity and time of the HPQD of Experimental Example 5 and Comparative Example 2 under three different conditions. As illustrated in FIG. 8A, when the above two HPQDs are exposed to a normal-pressure environment with a relative humidity of 60% and temperature of 20° C. for 8 months, the relative PL intensity of the HPQD of Experimental Example 5 remains at about 80%, while the relative PL intensity of the HPQD of the Experimental Example 2 drops sharply to about 30% after 2 months. As illustrated in FIG. 8B, when the above two HPQDs are exposed to 16W ultraviolet light (with a wavelength of 306 nm) at the relative humidity of 60% and the temperature of 40° C. for 60 days, the relative PL intensity of the HPQD of Experimental Example 5 remains at about 90%, while the relative PL intensity of the HPQD of Experimental Example 2 drops sharply to less than 10% after 6 days. As illustrated in FIG. 8C, the relative PL intensity of the HPQD of Experimental Example 5 is still much higher than the relative PL intensity of the HPQD of Experimental Example 2 after the above two HPQDs were exposed to a high-temperature environment with temperature of 100° C. for 4 months. From the results in FIG. 8A to FIG. 8C, it can be seen that stability of the HPQD of Experimental Example 5 is much better than stability of the HPQD of Experimental Example 2 under a high-relative-humidity, strong-light and high-temperature environment.

This is because the CNCs with high electronegativity in the present embodiment interact with the ligands between cations ($MA^+$ or $Pb^+$) to protect or stabilize the surfaces of perovskite quantum dots, so as to achieve better stability.

To sum up, the present embodiment provides a method for synthesizing a perovskite quantum dot film, in which the sulfate groups of a plurality of CNCs are connected with a plurality of perovskite quantum dots, such that the plurality of perovskite quantum dots is uniformly distributed among the plurality of CNCs, thereby improving the stability of the perovskite quantum dot film.

In addition, the synthesis method provided by the present embodiment can improve the flexibility and tensile property of the perovskite quantum dot film by adjusting the water content of the CNC solution. Besides, the synthesis method provided by the present embodiment can also adjust the wavelength of the light emitted by the perovskite quantum dots by adjusting the concentration of the precursor solution.

What is claimed is:

1. A method for synthesizing a perovskite quantum dot film, comprising:
    preparing a cellulose nanocrystal (CNC) solution, wherein the CNC solution comprises a plurality of CNCs with sulfate groups;
    preparing a precursor solution;
    mixing the CNC solution and the precursor solution to form a mixed solution; and
    filtering and drying the mixed solution to form a perovskite quantum dot film, wherein the perovskite quantum dot film comprises a plurality of perovskite quantum dots uniformly distributed among the CNCs, and the perovskite quantum dots are represented by the following formula (1):

$$ABX_3 \qquad (1),$$

wherein A comprises an inorganic cation or an organic amine, the inorganic cation comprises Li, Na, K, Rb, Cs or a combination thereof, and the organic amine comprises ammonia, methylamine, formamidine acetate, formamidine amine, formamidine, ethylenediamine, dimethylamine, imidazole, acetamidine, propylamine, isopropyl amine, trimethylenediamine, ethylamine, butylamine, isobutylamine, tert-butyl amine, diethylamine, 5-aminovaleric acid, 2-thiophene methylamine, hexylamine, aniline, benzylamine, phenylethylamine, octylamine, decylamine, dodecylamine, tetradecylamine, hexadecylamine, octadecylamine, eicosamine or a hereof; B comprises Cd, Co Cr Cu Fe, Ge, Pb Sn or a combination thereof; and X comprises halogen.

2. The method for synthesizing the perovskite quantum dot film according to claim 1, wherein preparing the CNC solution comprises:
    dissolving CNC powder in water to form a first solution; and
    dissolving the first solution in an organic solvent to form the CNC solution.

3. The method for synthesizing the perovskite quantum dot film according to claim 2, wherein flexibility and a tensile property of the perovskite quantum dot film increase with an increase of a water content of the first solution.

4. The method for synthesizing the perovskite quantum dot film according to claim 1, wherein the sulfate groups of the CNCs are connected with the perovskite quantum dots to improve stability of the perovskite quantum dot film.

5. The method for synthesizing the perovskite quantum dot film according to claim 1, wherein preparing the precursor solution comprises:

providing a first precursor comprising A and X;
providing a second precursor comprising B and X; and
adding the first precursor and the second precursor into an organic solvent and uniformly mixing the first precursor, the second precursor and the organic solvent.

6. The method for synthesizing the perovskite quantum dot film according to claim 5, wherein a wavelength of light emitted by the perovskite quantum dots increases with an increase of a concentration of the precursor solution.

7. The method for synthesizing the perovskite quantum dot film according to claim 1, wherein each CNC has a length of 100 nm to 300 nm and a width of 3 nm to 20 nm.

8. The method for synthesizing the perovskite quantum dot film according to claim 1, wherein a molecular weight of the CNC is 14700 to 27850.

* * * * *